United States Patent
Qin et al.

(10) Patent No.: US 10,463,118 B1
(45) Date of Patent: Nov. 5, 2019

(54) MAGNETIC SILICONE WATCHBAND

(71) Applicant: Lucky Goldjyx Co., Ltd, Dongguan, Guang Dong (CN)

(72) Inventors: Guobin Qin, Dongguan (CN); Aiqin Chang, Dongguan (CN)

(73) Assignee: Lucky Goldjyx Co., Ltd, Dongguan (CN)

(*) Notice: Subject to any disclaimer, the term of this patent is extended or adjusted under 35 U.S.C. 154(b) by 0 days.

(21) Appl. No.: 16/459,633

(22) Filed: Jul. 2, 2019

(30) Foreign Application Priority Data

Aug. 29, 2018 (CN) .......................... 2018 1 0996230

(51) Int. Cl.
*A44C 5/20* (2006.01)
*A44C 5/00* (2006.01)
*F16B 1/00* (2006.01)

(52) U.S. Cl.
CPC .............. *A44C 5/0061* (2013.01); *A44C 5/20* (2013.01); *F16B 1/00* (2013.01); *F16B 2001/0035* (2013.01)

(58) Field of Classification Search
CPC .... A44C 5/00; A44C 5/18; A44C 5/20; A44C 5/0061; G04B 37/14; G04B 37/1486; F16B 1/00; F16B 2001/0035
USPC .................................................. 224/164–179
See application file for complete search history.

(56) References Cited

U.S. PATENT DOCUMENTS

| | | | | |
|---|---|---|---|---|
| 2,553,889 | A * | 5/1951 | Batdorf | A44C 5/20 24/598.9 |
| 2,615,227 | A * | 10/1952 | Hornik | A44C 5/2071 24/303 |
| 2,648,884 | A * | 8/1953 | Loofboro | A44C 5/2071 24/303 |
| 4,941,236 | A * | 7/1990 | Sherman | A44C 5/2071 24/265 WS |
| 6,234,668 | B1 * | 5/2001 | Cooper | G04B 37/1406 224/164 |
| 6,598,271 | B2 * | 7/2003 | Nire | A41F 1/002 24/265 WS |
| 6,598,272 | B2 * | 7/2003 | Nire | A41F 1/002 24/265 WS |
| 7,363,687 | B2 * | 4/2008 | Kraus | A44C 5/14 24/303 |
| 8,919,019 | B2 * | 12/2014 | Martinez | G06F 15/00 40/633 |
| 8,997,318 | B2 * | 4/2015 | Nicolas | A44C 5/04 24/265 WS |

(Continued)

*Primary Examiner* — Sean P Kayes

(57) ABSTRACT

The present disclosure discloses a magnetic silicone watchband, including a first watchband and a second watchband corresponding matched to the first watchband. An arc-shaped watchband head is provided at one end of the first watchband and is connected to the second watchband. A semi-circular magnet is provided at an upper end of the watchband head. A rectangular hoop is provided at the end of the second watchband and is corresponding matched with the first watchband. A mesh-shaped metal mesh belt is provided in the interior of the second watchband, and the metal mesh belt is magnetically attracted to the magnet. The present disclosure installs a magnet on the watchband head of the first watchband and installs a metal mesh belt in the interior of the second watchband, thereby realizing the arbitrary adjustment of the connection size between the first watchband and the second watchband.

5 Claims, 1 Drawing Sheet

(56) References Cited

U.S. PATENT DOCUMENTS

| | | | | |
|---|---|---|---|---|
| 9,330,825 B2* | 5/2016 | Sarai | ............... | H01F 7/02 |
| 9,392,829 B2* | 7/2016 | Manuello | ............... | A41F 1/002 |
| 10,098,422 B2* | 10/2018 | Fiedler | ............... | A44C 5/0007 |
| 10,117,504 B2* | 11/2018 | Bataillou | ............... | A44C 5/20 |
| 10,206,463 B2* | 2/2019 | de Jong | ............... | A44C 5/2071 |
| 10,254,795 B2* | 4/2019 | Huitema | ............... | G06F 1/1652 |
| 10,289,163 B2* | 5/2019 | Huitema | ............... | G06F 1/163 |
| 2014/0000312 A1* | 1/2014 | Nicolas | ............... | A44C 5/04 63/3.2 |
| 2015/0366098 A1* | 12/2015 | Lapetina | ............... | G04B 37/1486 361/807 |
| 2016/0282899 A1* | 9/2016 | Inagaki | ............... | G04G 9/04 |
| 2016/0327987 A1* | 11/2016 | Huitema | ............... | G06F 1/1652 |
| 2017/0235341 A1* | 8/2017 | Huitema | ............... | G06F 1/163 361/679.03 |
| 2019/0029372 A1* | 1/2019 | Zhang | ............... | A44C 5/0015 |
| 2019/0239629 A1* | 8/2019 | Calman | ............... | A45F 5/021 |

* cited by examiner

MAGNETIC SILICONE WATCHBAND

TECHNICAL FIELD

The present disclosure relates to the field of watchband technology, and in particular to a magnetic silicone watchband.

BACKGROUND

In daily life, the silicone watchbands that people worn are usually adjusted by punching holes in one of the watchband and inserting the jack pins which are at one end of the other watchband into different holes, to stepwise adjust the size of the watchband to match the wrist, which is not good enough for everyone's wrist thickness.

SUMMARY OF THE DISCLOSURE

The objective of the present disclosure is to provide a magnetic silicone watchband with novel design, simple structure and beautiful appearance, which can be adjusted according to the thickness of the wrist optionally, convenient to use, and comfortable to wear.

In order to realize the above objective, the present disclosure is achieved by the following technical solutions.

A magnetic silicone watchband, includes a first watchband and a second watchband corresponding matched to the first watchband; an arc-shaped watchband head is provided at one end of the first watchband and is connected to the second watchband. A semi-circular magnet is provided at an upper end of the watchband head. A rectangular hoop is provided at the end of the second watchband and is corresponding matched with the first watchband; A mesh-shaped metal mesh belt is provided in the interior of the second watchband, and the metal mesh belt is magnetically attracted to the magnet.

Therein, the material of the first watchband and the second watchband is silica gel.

Therein, the first watchband is provided with a first watchband connector, wherein the first watchband connector is located at the other end of the first watchband opposite to the watchband head.

Therein, the upper end of the watchband head is provided with a receiving groove for accommodating the magnet, and the magnet is fixed in the receiving groove by an adhesive.

Therein, the second watchband is provided with a second watchband connector, the second watchband connector is located at the other end of the second watchband opposite to the hoop.

The beneficial effects of the present disclosure are shown as follows: A magnetic silicone watchband providing by the present disclosure, includes a first watchband and a second watchband corresponding matched to the first watchband. An arc-shaped watchband head is provided at one end of the first watchband and is connected to the second watchband. A semi-circular magnet is provided at an upper end of the watchband head. A rectangular hoop is provided at the end of the second watchband and is corresponding matched with the first watchband. A mesh-shaped metal mesh belt is provided in the interior of the second watchband, and the metal mesh belt is magnetically attracted to the magnet. The present disclosure installs a magnet on the watchband head of the first watchband and provides a metal mesh belt in the second watchband, so that the first watchband and the second watchband are tightly magnetically attracted to each other without buttoning, thereby realizing arbitrary adjustment of the size of the connection between the first watchband and the second watchband. By providing the metal mesh belt in the interior of the second watchband, as the metal mesh belt is soft and can be bent at will, the silicone comfort level of the second watchband is not changed, the overall wearing comfort maintains as the wearing comfort of the silicone as before, Therefore, the present disclosure has the advantages of novel design, simple structure, beautiful appearance, arbitrary adjustment according to the thickness of the wrist, which is convenient to use and comfortable to wear.

BRIEF DESCRIPTION OF THE DRAWINGS

The present disclosure is further illustrated by the accompany drawings, but the embodiments in the accompany drawings do not constitute any limitation to the present disclosure.

Figure 1:
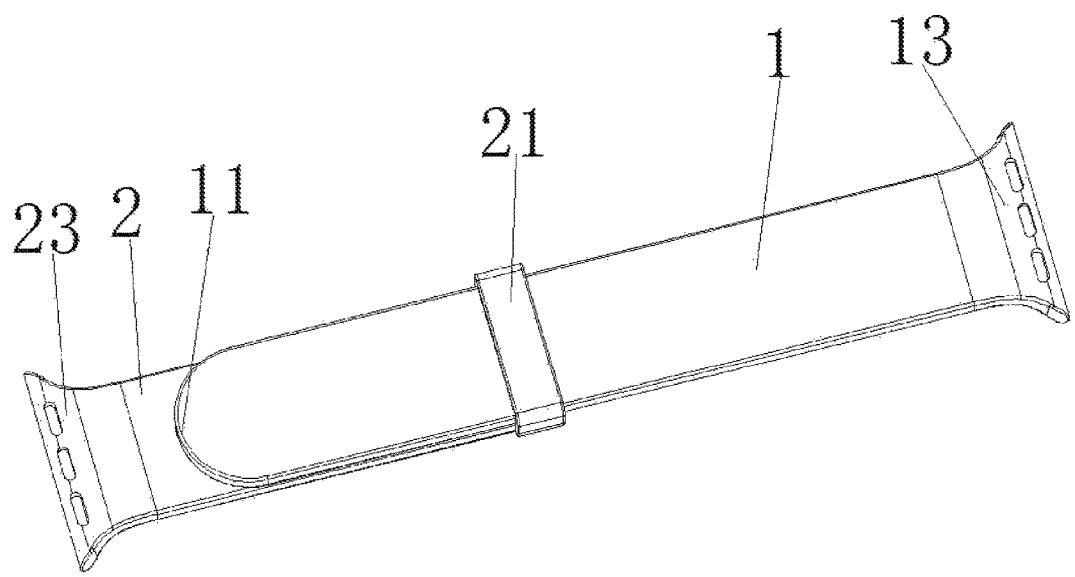
FIG. 1 is a schematic view of the structure of the present disclosure.
Figure 2:
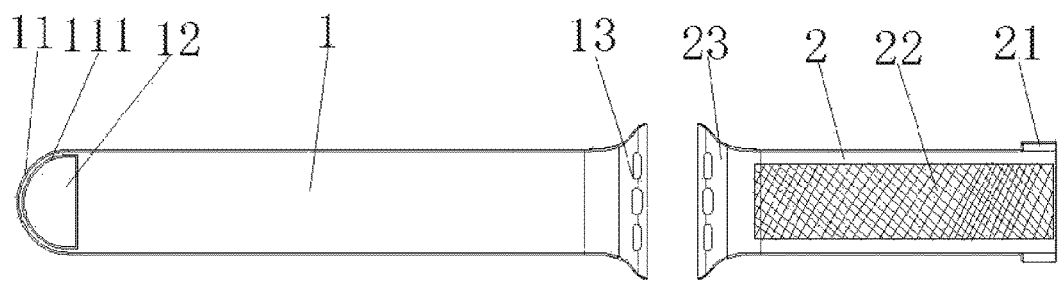
FIG. 2 is a schematic partial cross-sectional view showing the structure of the present disclosure.

Included in FIGS. 1-2 are as below:

| | |
|---|---|
| 1 - first watchband; | 11 - watchband head; |
| 111 - receiving groove; | 12 - magnet; |
| 13 - first watchband connector; | 2 - second watchband; |
| 21 - hoop; | 22 - metal mesh belt; |
| 23 - second watchband connector. | |

DETAILED DESCRIPTION OF THE EMBODIMENTS

The present disclosure will now be described in connection with specific embodiments.

As shown in FIGS. 1-2, A magnetic silicone watchband, includes a first watchband 1 and a second watchband 2 corresponding matched to the first watchband 1. An arc-shaped watchband head 11 is provided at one end of the first watchband 1 and is connected to the second watchband 2. A semi-circular magnet 12 is provided at an upper end of the watchband head 11. A rectangular hoop 21 is provided at the end of the second watchband 2 and is corresponding matched with the first watchband 1. A mesh-shaped metal mesh belt 22 is provided in the interior of the second watchband 2, and the metal mesh belt 22 is magnetically attracted to the magnet 12.

As a preferred embodiment of the present embodiment, the material of the first watchband 1 and the second watchband 2 is silica gel.

Further, the first watchband 1 is provided with a first watchband connector 13, wherein the first watchband connector 13 is located at the other end of the first watchband 1 opposite to the watchband head 11.

Further, the upper end of the watchband head 11 is provided with a receiving groove 111 for accommodating the magnet 12, and the magnet 12 is fixed in the receiving groove 111 by an adhesive.

Further, the second watchband 2 is provided with a second watchband connector 23, wherein the second watchband connector 23 is located at the other end of the second watchband 2 opposite to the hoop 21.

Further explanation is provided that the present disclosure installs a magnet 12 on the watchband head 11 of the first watchband 1 and a metal mesh belt 22 in the second watchband 2, so that the first watchband 1 and the second watchband 2 are tightly magnetically attracted to each other without buttoning, thereby realizing arbitrary adjustment of the size of the connection between the first watchband 1 and the second watchband 2. By providing the metal mesh belt 22 in the interior of the second watchband 2, as the metal mesh belt 22 is soft and can be bent at will, and the silicone comfort level of the second watchband 2 is not changed, the overall wearing comfort is maintained as the wearing comfort of the original silicone, Therefore, the present disclosure has the advantages of novel design, simple structure, beautiful appearance, arbitrary adjustment according to the thickness of the wrist, which is convenient to use and comfortable to wear.

The above content is only a preferred embodiment of the present disclosure, and those ordinary person skilled in the art may be have a modification in the specific embodiment and application scope according to the concept of the present disclosure. The content of the present specification should not be regarded as limitations to the present disclosure.

The invention claimed is:

1. A magnetic silicone watchband, comprising a first watchband (1) and a second watchband (2) corresponding matched to the first watchband (1);

wherein an arc-shaped watchband head (11) is provided at one end of the first watchband (1) and is connected to the second watchband (2); a semi-circular magnet (12) is provided at an upper end of the watchband head (11); a rectangular hoop (21) is provided at one end of the second watchband (2) and is corresponding matched with the first watchband (1); a mesh-shaped metal mesh belt (22) is provided in the interior of the second watchband (2), and the metal mesh belt (22) is magnetically attracted with the magnet (12).

2. The magnetic silicone watchband according to claim 1, wherein material of the first watchband (1) and the second watchband (2) is silica gel.

3. The magnetic silicone watchband according to claim 1, wherein the first watchband (1) is provided with a first watchband connector (13), wherein the first watchband connector (13) is located at the other end of the first watchband (1) opposite to the watchband head (11).

4. The magnetic silicone watchband according to claim 1, wherein an upper end of the watchband head (11) is provided with a receiving groove (111) for accommodating the magnet (12), and the magnet (12) is fixed in the receiving groove (111) by an adhesive.

5. The magnetic silicone watchband according to claim 1, wherein the second watchband (2) is provided with a second watchband connector (23), wherein the second watchband connector (23) is located at the other end of the second watchband (2) opposite to the hoop (21).

* * * * *